Jan. 15, 1946. P. C. TEMPLE 2,393,128
HYDRAULIC TRANSMISSION
Filed Aug. 19, 1942 2 Sheets-Sheet 1

Inventor
PAUL C. TEMPLE
By Albert G. Blodgett
Attorney

Jan. 15, 1946.  P. C. TEMPLE  2,393,128
HYDRAULIC TRANSMISSION
Filed Aug. 19, 1942  2 Sheets-Sheet 2
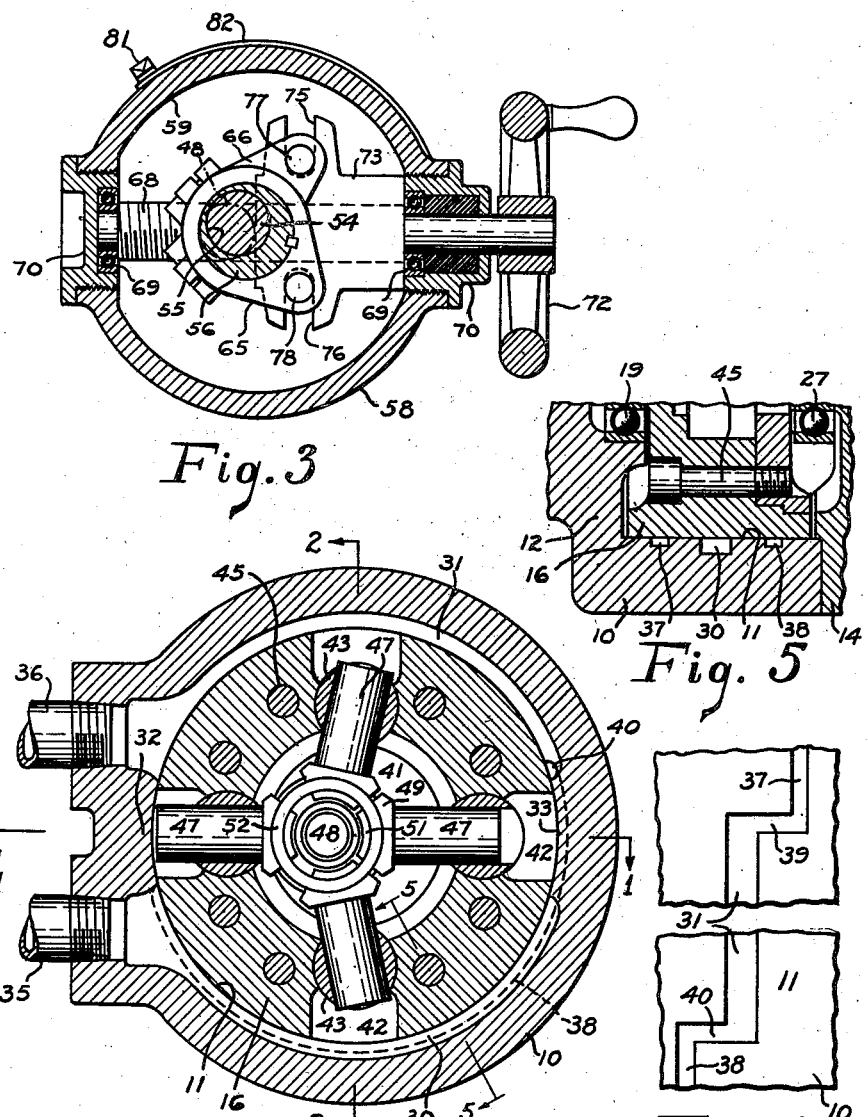
Inventor
PAUL C. TEMPLE
By Albert G. Blodgett
Attorney Patented Jan. 15, 1946

2,393,128

UNITED STATES PATENT OFFICE 2,393,128

HYDRAULIC TRANSMISSION

Paul C. Temple, Decatur, Ill., assignor to A. W. Cash Company, Decatur, Ill., a corporation of Delaware Application August 19, 1942, Serial No. 455,325

9 Claims. (Cl. 103—161)

This invention relates to hydraulic transmissions, and more particularly to pumps and motors of the variable displacement type.

It is one object of the invention to provide a hydraulic transmission which will be highly efficient in operation, and comparatively simple and inexpensive to manufacture.

It is a further object of the invention to provide a hydraulic transmission which will remain in proper hydraulic balance at all times.

It is a further object of the invention to provide a hydraulic transmission having a simple and positive mechanism for adjusting its displacement.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a section through a hydraulic transmission, the section being taken on the line 1—1 of Fig. 4;

Fig. 3 is a section on the line 3—3 of Fig. 2;

Fig. 4 is a section on the line 4—4 of Fig. 2;

Fig. 5 is a section on the line 5—5 of Fig. 4; and

Fig. 6 is a diagrammatic view showing the relationship of certain balancing grooves to the high pressure chamber.

Figure 1:
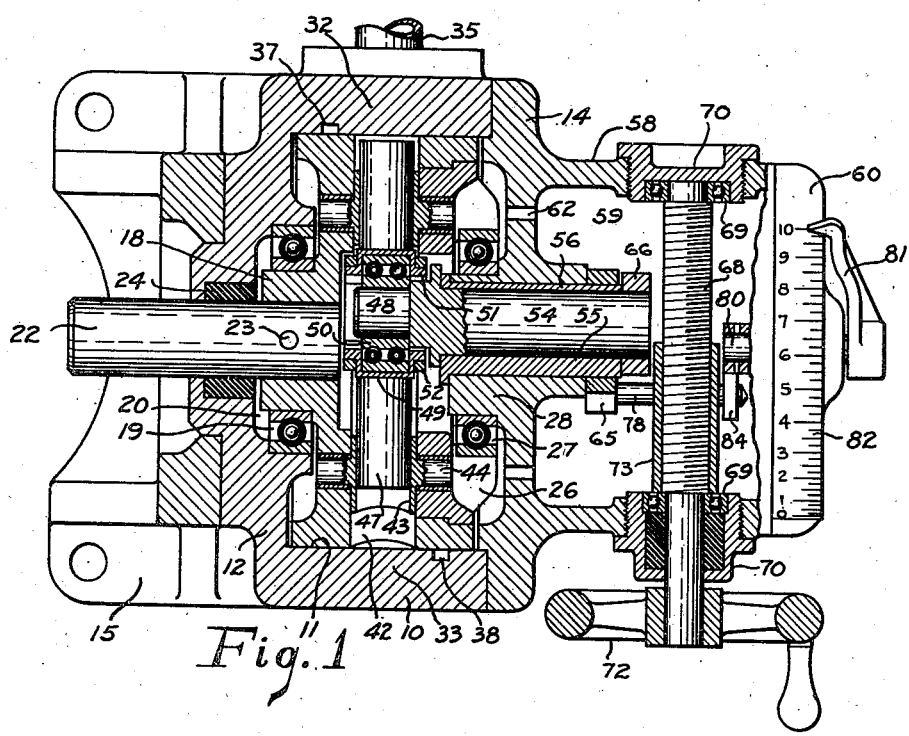

The embodiment illustrated comprises a hollow body or casing 10 having a cylindrical bore 11 therein, this bore being closed at one end by a wall 12 integral with the casing and at the other end by a removable plate 14. The casing is supported by a suitable bracket 15 which is fastened to the end wall 12. Within the casing there is mounted a rotor 16 having a cylindrical outer surface arranged to fit closely within the bore 11. The rotor 16 is provided at one end with a hub 18 which is supported in the annular inner race of a ball bearing 19, the outer race of this bearing being mounted in a recess 20 in the wall 12. A shaft 22 is secured to the hub 18 by means of a taper pin 23 and extends outwardly through an annular sealing means 24 carried by the end wall 12. On the other end of the rotor there are provided circumferentially spaced lugs 26 which engage the annular outer race of a ball bearing 27, the inner race of this bearing being mounted on a hub 28 integral with the plate 14.

The bore 11 is provided with two diametrically opposed grooves 30 and 31, each of which extends around somewhat less than half the circumference of the bore, as best shown in Fig. 4. The adjacent ends of these grooves are separated by diametrically opposed abutment portions 32 and 33. The groove 30 forms a low pressure chamber to which an external pipe 35 is connected, and the groove 31 forms a high pressure chamber to which an external pipe 36 is connected. Two circumferentially extending pressure-balancing grooves 37 and 38 are provided on opposite sides of the low pressure groove 30, each of the balancing grooves having one-half the width of the high pressure groove 31. The balancing groove 37 extends slightly beyond the abutment 32 and communicates with the high pressure groove 31 through a connecting groove 39 (Fig. 6) whereas the balancing groove 38 extends slightly beyond the abutment 33 and communicates with the high pressure groove 31 through a connecting groove 40.

The rotor 16 is provided with a central recess 41 (Fig. 4) from which a series of four circumferentially spaced openings 42 extend radially outward. The outer ends of these openings are slightly narrower in a circumferential direction than the abutments 32 and 33, so that a seal will always be maintained to prevent direct communication between the chambers 30 and 31. The inner portion of each opening 42 is shaped to receive a member 43 having a cylindrical outer surface and a pair of pins or trunnions 44 on its opposite ends. These pins 44 are pivotally supported in the rotor, so that the members 43 may oscillate about axes parallel with the axis of the rotor. To facilitate manufacture and assembly, the rotor is formed of two annular portions fastened together by means of recessed-head screws 45 (Figs. 4 and 5). Each member 43 is bored transversely to receive a slidable cylindrical piston 47, the axes of the four pistons all lying in a common plane perpendicular to the axis of the rotor. These pistons are reciprocated during the rotation of the rotor, and for this purpose their inner ends are connected to an actuating device in the form of a trunnion 48 which is located within the recess 41 and offset from the rotor axis in a direction toward the abutment 32, in an axial plane which separates the chambers 30 and 31, as shown in Fig. 4. Preferably the inner ends of the pistons are provided with heads 49 which are grooved for slidable engagement with the outer race of an anti-friction bearing 50, the inner race of this bearing being mounted on the trunnion 48. The piston heads 49 are provided with laterally projecting arcuate flanges 51 which are encircled by two rings 52 arranged to hold the heads inwardly against the outer bearing race and thus maintain the axes of the pistons in radial positions with respect to the bearing 50.

It will now be apparent that because of the offset positioning of the trunnion 48, the pistons 47 and members 43 will have relative reciprocation as the rotor 16 turns about its axis. Each piston will reach its limit of outward movement relative to the associated member 43 when directly opposite the abutment 32, and its limit of inward movement when directly opposite the abutment 33. If the mechanism is to be used as a pump, the rotor will be driven in an anti-clockwise direction as viewed in Fig. 4. As the pistons travel past the low-pressure chamber 30 they will be moving inwardly, and as they travel past the high-pressure chamber 31 they will be moving outwardly. Thus fluid will be drawn through the pipe 35 and the chamber 30 into the rotor openings 42 and discharged from these openings into the chamber 31 and the pipe 36. If the mechanism is to be used as a motor, high pressure fluid will be supplied through the pipe 36. This will cause the rotor to rotate in a clockwise direction as viewed in Fig. 4, the exhaust fluid being discharged through the pipe 35.

The fluid displacement or capacity of the mechanism is a function of the distance by which the trunnion 48 is offset from the rotor axis. In order that the displacement may be varied as desired, provision is made for adjusting the trunnion along a straight radial line to and from the rotor axis. For this purpose the trunnion is formed on one end of a shaft 54 which extends througl a bore 55 in a sleeve 56, the sleeve being rotatably mounted within the hub 28. The trunnion 48 is eccentrically positioned on the shaft 54, and the bore 55 is eccentrically positioned within the sleeve 56, the respective radii or throws of the two eccentrics being of equal length. The axis of the outer cylindrical surface of the sleeve 56 is parallel with the rotor axis and is located approximately midway between the rotor axis and the trunnion axis when the latter is in the position of maximum offset. With this construction the trunnion axis can be moved along the desired radial line simply by turning the two eccentrics simultaneously in opposite directions at the same rate.

Figure 2:
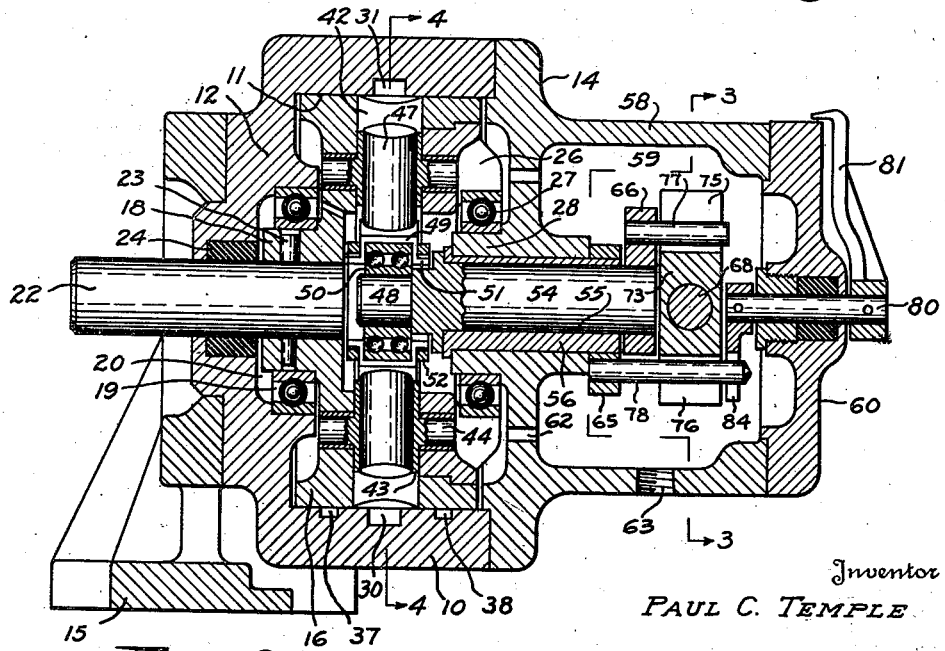
Fig. 2 is a section on the line 2—2 of Fig. 4.

Various mechanisms may be employed for effecting this adjustment of the eccentrics. In the preferred construction illustrated, a hollow cylindrical wall 58 extends outwardly from the plate 14 to form a chamber 59 which is closed at its outer end by a plate 60. In order to prevent pressure from becoming excessive in the casing 10, openings 62 are provided in the plate 14 so that any fluid which escapes past the various relatively moving parts may pass into the chamber 59, whence it may be withdrawn through a drain pipe connected with a tapped opening 63 (Fig. 2) in the bottom portion of the wall 58. The sleeve 56 projects outwardly beyond the hub 28 and into the chamber 59, while the shaft 54 projects outwardly beyond the end of the sleeve. A downwardly extending arm 65 is secured to the outer end of the sleeve 56, and an upwardly extending arm 66 is secured to the outer end of the shaft 54. A horizontal shaft 68 is rotatably supported in bearings 69 which are carried by plugs 70 screw-threaded in the wall 58 on opposite sides of the chamber 59. One end of this shaft projects outside of the chamber and is provided with a handwheel 72. The portion of the shaft within the chamber is screw-threaded and carries a nut can move the nut 73 across the chamber 59 and adjacent to the end of the trunnion shaft. The movements of the nut 73 are utilized to swing the arms 65 and 66 through substantially equal angles and in opposite directions. For this purpose, the nut is provided with two aligned vertical slots 75 and 76 which receive the cylindrical end portions of two pins 77 and 78 respectively. The pin 77 is fixed in the arm 66, and the pin 78 is fixed in the arm 65.

In order that the operator may have a visual indication of the adjustment of the mechanism, a shaft 80 is rotatably supported in the end plate 60, and the outer end of this shaft carries a pointer 81 which travels over a scale 82 on the top of the plate. The inner end of the shaft 80 carries a forked arm 84 which straddles the pin 78, so that the movements of the pin will be transmitted to the pointer.

From the above disclosure it will be apparent that the invention may be operated either as a pump or as a motor. In each case the pipe 35 will form the low pressure fluid connection and the pipe 36 will form the high pressure fluid connection. Since the high pressure fluid from the chamber 31 is free to enter the two grooves 37 and 38, the rotor 16 will be in hydraulic balance at all times. The position of the trunnion 48 determines the stroke of the pistons and the displacement of the apparatus. As the trunnion is moved toward the axis of the rotor the displacement will decrease, becoming zero when the axes of the trunnion and rotor coincide. The shaft 54 and the eccentric sleeve 56 provide a very steady support for the trunnion and at the same time afford a simple and positive means for adjusting the trunnion along an exact radial line.

Having thus described my invention, what I claim as new and desire to secure by Letters Patent is:

1. A hydraulic transmission comprising a casing having a bore provided with diametrically opposed high pressure and low pressure chambers, a rotor rotatably mounted within the bore and provided with a series of circumferentially spaced openings in its periphery, these openings registering with the said chambers alternately as the rotor rotates, a series of pistons slidably mounted in the rotor adjacent the said openings, means to slide each piston into its associated opening while it registers with one of the chambers and out of its associated opening while it registers with the other of the chambers, and a pressure-balancing chamber laterally adjacent to the low pressure chamber and connected to the high pressure chamber.

2. A hydraulic transmission comprising a casing having a bore provided with diametrically opposed high pressure and low pressure chambers, a rotor rotatably mounted within the bore and provided with a series of circumferentially spaced openings in its periphery, these openings registering with the said chambers alternately as the rotor rotates, a series of pistons slidably mounted in the rotor adjacent the said openings, means to slide each piston into its associated opening while it registers with one of the chambers and out of its associated opening while it registers with the other of the chambers, and two pressure-balancing chambers located on opposite sides of the low pressure chamber and connected to the high pressure chamber.

3. A hydraulic transmission comprising a casing having a cylindrical bore provided with two diametrically opposed grooves extending circumferentially and forming high and low pressure chambers, a cylindrical rotor rotatably mounted within the bore and provided with a series of circumferentially spaced openings in its periphery, these openings registering with the said chambers alternately as the rotor rotates, a series of pistons slidably mounted in the rotor adjacent the said openings. means to slide each piston into its associated opening while it registers with one of the chambers and out of its associated opening while it registers with the other of the chambers, and two pressure-balancing grooves located in the bore on opposite sides of the low pressure chamber and connected to the high pressure chamber, each of the pressure-balancing grooves having a width equal to substantially one-half the width of the groove forming the high pressure chamber.

4. A hydraulic transmission comprising a casing having a bore provided with diametrically opposed high pressure and low pressure chambers, a rotor rotatably mounted within the bore and provided with a central recess from which a series of circumferentially spaced openings extend radially outward, these openings registering with the said chambers alternately as the rotor rotates, a member pivotally mounted in each opening for oscillation about an axis parallel with the rotor axis, each member having a transverse bore therethrough, a piston slidably mounted in each transverse bore and extending in a generally radial direction, a device located within the central recess and offset from the rotor axis in an axial plane which separates the said chambers, and means connecting the inner ends of the pistons to the device arranged to maintain the axes of the pistons in radial positions with respect to the device and to slide each piston outwardly while its associated opening registers with one of the chambers and inwardly while its associated opening registers with the other of the chambers.

5. A hydraulic transmission comprising a casing having a bore provided with diametrically opposed high pressure and low pressure chambers, a rotor rotatably mounted within the bore and provided with a central recess from which a series of circumferentially spaced openings extend radially outward, these openings registering with the said chambers alternately as the rotor rotates, a member pivotally mounted in each opening for oscillation about an axis parallel with the rotor axis, each member having a transverse bore therethrough, a piston slidably mounted in each transverse bore and extending in a generally radial direction, a device located within the central recess and offset from the rotor axis in an axial plane which separates the said chambers, an antifriction bearing having an annular outer race and an annular inner race mounted upon the device, heads upon the inner ends of the pistons having laterally projecting arcuate flanges, and rings encircling the flanges to hold the heads in sliding contact with the said outer race and maintain the axes of the pistons in radial positions with respect to the bearing, whereby each piston will slide outwardly while its associated opening registers with one of the chambers and inwardly while its associated opening registers with the other of the chambers.

6. A hydraulic transmission comprising a casing having a bore provided with diametrically opposed high pressure and low pressure chambers, a rotor rotatably mounted within the bore and provided with a central recess from which a series of circumferentially spaced openings extend radially outward, these openings registering with the said chambers alternately as the rotor rotates, a piston mounted in each opening and slidable in a generally radial direction, actuating means for the pistons including a device located within the recess and offset from the rotor axis in an axial plane which separates the said chambers, the said actuating means serving to slide each piston outwardly while its associated opening registers with one of the chambers and inwardly while its associated opening registers with the other of the chambers, a shaft supporting the said device in a position offset from the shaft axis, a sleeve having an offset bore therein which receives and supports the shaft, and means to turn the sleeve and the shaft about their respective axes simultaneously in opposite directions and thereby move the said device toward or from the rotor axis to vary the capacity of the transmission.

7. A hydraulic transmission comprising a casing having a bore provided with diametrically opposed high pressure and low pressure chambers, a rotor rotatably mounted within the bore and provided with a central recess from which a series of circumferentially spaced openings extend radially outward, these openings registering with the said chambers alternately as the rotor rotates, a piston mounted in each opening and slidably in a generally radial direction, actuating means for the pistons including a device located within the recess and offset from the rotor axis in an axial plane which separates the said chambers, the said actuating means serving to slide each piston outwardly while its associated opening registers with one of the chambers and inwardly while its associated opening registers with the other of the chambers, a shaft supporting the said device, a sleeve having a bore therein which receives and supports the shaft, the said device being offset from the axis of the shaft by a certain distance and the bore being offset from the axis of the sleeve by the same distance, and means to turn the sleeve and the shaft about their respective axes simultaneously in opposite directions at substantially equal rates and thereby move the said device in a substantially radial line to or from the axis of the rotor to vary the capacity of the transmission.

8. A hydraulic transmission comprising a casing having a bore provided with diametrically opposed high pressure and low pressure chambers, a rotor rotatably mounted within the bore and provided with a central recess from which a series of circumferentially spaced openings extend radially outward, these openings registering with the said chambers alternately as the rotor rotates, a piston mounted in each opening and slidable in a generally radial direction, actuating means for the pistons including a device located within the recess and offset from the rotor axis in an axial plane which separates the said chambers, the said actuating means serving to slide each piston outwardly while its associated opening registers with one of the chambers and inwardly while its associated opening registers with the other of the chambers, a shaft supporting the said device, a sleeve arranged with its axis in the said axial plane, the sleeve having a bore therein for the reception of the shaft, the said device being offset from the axis of the shaft by a certain distance and the bore being offset from the axis of the sleeve by the same distance, two arms extending from the shaft and the sleeve respectively, a rotatable screw, a nut mounted upon the screw and arranged to be moved along the same as the screw is rotated, and connections between the nut and the two arms to turn them simultaneously through equal angles in opposite directions and thereby move the said device in a substantially radial line to or from the axis of the rotor to vary the capacity of the transmission.

9. A hydraulic transmission comprising a casing having a bore provided with diametrically opposed high pressure and low pressure chambers, a rotor rotatably mounted within the bore and provided with a central recess from which a series of circumferentially spaced openings extend radially outward, these openings registering with the said chambers alternately as the rotor rotates, a piston mounted in each opening and slidable in a generally radial direction, actuating means for the pistons including a device located within the recess and offset from the rotor axis in an axial plane which separates the said chambers, the said actuating means serving to slide each piston outwardly while its associated opening registers with one of the chambers and inwardly while its associated opening registers with the other of the chambers, a shaft supporting the said device, a sleeve arranged with its axis in the said axial plane, the sleeve having a bore therein for the reception of the shaft, the said device being offset from the axis of the shaft by a certain distance and the bore being offset from the axis of the sleeve by the same distance, two arms extending from the shaft and the sleeve respectively, a rotatable screw, a nut mounted upon the screw and arranged to be moved along the same as the screw is rotated, the nut having two aligned slots therein, and two pins fixed to the respective arms and extending into the slots to turn the said arms simultaneously through equal angles in opposite directions and thereby move the said device in a substantially radial line to or from the axis of the rotor to vary the capacity of the transmission.

PAUL C. TEMPLE.